(12) United States Patent
Mileti

(10) Patent No.: US 8,590,752 B2
(45) Date of Patent: Nov. 26, 2013

(54) METERED DISPENSING SYSTEM WITH NESTED BOAT FITMENT

(75) Inventor: Robert J. Mileti, Torrington, CT (US)

(73) Assignee: Sealed Air Corporation (US), Elmwood Park, NJ (US)

( * ) Notice: Subject to any disclaimer, the term of this patent is extended or adjusted under 35 U.S.C. 154(b) by 252 days.

(21) Appl. No.: 13/083,958

(22) Filed: Apr. 11, 2011

(65) Prior Publication Data

US 2011/0248050 A1 Oct. 13, 2011

Related U.S. Application Data

(60) Provisional application No. 61/323,188, filed on Apr. 12, 2010.

(51) Int. Cl.
| | |
|---|---|
| *B65D 37/00* | (2006.01) |
| *B67D 7/06* | (2010.01) |
| *B65D 35/56* | (2006.01) |
| *A46B 11/02* | (2006.01) |
| *B43K 5/00* | (2006.01) |
| *A47L 13/22* | (2006.01) |

(52) U.S. Cl.
USPC ........ 222/207; 222/105; 222/183; 401/188 R; 401/206; 401/278

(58) Field of Classification Search
USPC ......... 222/207, 212, 213, 214, 206, 209, 182, 222/183, 105, 380, 335, 581, 632, 633; 401/188 R, 205, 206, 278, 270; 383/906, 80, 82
See application file for complete search history.

(56) References Cited

U.S. PATENT DOCUMENTS

| | | | |
|---|---|---|---|
| 6,439,429 B1 | 8/2002 | Gross | |
| 7,419,322 B2 | 9/2008 | Laflamme et al. | |
| 7,997,454 B2 * | 8/2011 | LaFlamme et al. | ............ 222/207 |
| 8,038,034 B2 * | 10/2011 | Pelfrey | ...................... 222/153.13 |
| 8,061,566 B2 * | 11/2011 | LaFlamme et al. | ............ 222/207 |
| 8,083,103 B2 * | 12/2011 | LaFlamme et al. | ............ 222/135 |
| 8,123,073 B2 * | 2/2012 | LaFlamme et al. | ................ 222/1 |
| 8,128,303 B2 * | 3/2012 | LaFlamme et al. | ........ 401/188 R |
| 2005/0199651 A1 * | 9/2005 | Laflamme et al. | ............ 222/107 |
| 2008/0149666 A1 * | 6/2008 | LaFlamme et al. | ............ 222/105 |
| 2008/0264973 A1 | 10/2008 | LaFlamme et al. | |

OTHER PUBLICATIONS

International Search Report and Written Opinion of the International Searching Authority; PCT/US2011/031925; Jun. 10, 2011; 8 pages.

* cited by examiner

*Primary Examiner* — Kevin P Shaver
*Assistant Examiner* — Stephanie E Williams
(74) *Attorney, Agent, or Firm* — St. Onge Steward Johnston & Reens LLC

(57) ABSTRACT

A fluid dispensing device includes a container made from a flexible material defining an interior fluid storage region, a flexible metering housing having a metering chamber in fluid communication with the fluid storage region, the flexible metering housing having a button heat sealed to a base plate, a unidirectional intake valve disposed between the container and the flexible metering housing and a unidirectional output valve in fluid communication with the flexible metering housing. The base plate has an extension with a recessed notch, a first tapered portion, and a second tapered portion opposite the first tapered portion with respect to the recessed notch, and the button has an extension and a notch corresponding to the extension and the recessed notch of the base plate.

18 Claims, 7 Drawing Sheets

METERED DISPENSING SYSTEM WITH NESTED BOAT FITMENT

CROSS-REFERENCE TO RELATED APPLICATIONS

The present application claims the benefit under 35 U.S.C. §119(e) of U.S. Provisional Patent Application Ser. No. 61/323,188 filed on Apr. 12, 2010, the content of which is incorporated herein by reference.

FIELD OF THE INVENTION

This invention relates generally to dispensing devices and packages. More specifically, the present invention relates to metering devices that can controllably dispense fluid media from a source of fluid media, such as a liquid, and methods for creating same.

BACKGROUND OF THE INVENTION

Various types of fluid material and media are employed for different purposes throughout commerce and industry. For example, there are various products in the areas of personal care, home care, air care, transportation care and food industries that require a fluid material to be dispensed in some manner from a source of such material. Further, when this material is sold in commerce, it must be contained and stored in some type of container while awaiting use. Ultimately, when that product is used, it must be dispensed from its storage container to the desired location for use.

In the prior art, there are many different types of dispensers that are employed for the delivery of a stored fluid material to its desired location for use. For example, a storage container having a flexible body with a nozzle tip extending therefrom is commonly provided for such a purpose. An example of such use can be seen in the context of a ketchup dispenser, where a user squeezes the container body to urge the fluid material (i.e., ketchup) out from container body and through the nozzle tip to accurately deposit the fluid material at the desired location. In such an application, the amount of fluid that is ultimately delivered is determined by how much the user actually squeezes the container body. While this method has provided marginally acceptable results, this method also typically yields an erratic fluid volume since more or less fluid material may be delivered on each successive squeeze of the container body. Also, the container must be held upright to avoid leakage because no valves are employed in the fluid nozzle tip.

In another example of a prior art dispensing device, a flexible container is provided that holds a volume of fluid material to be delivered. In an attempt to overcome the leakage issue noted above, a single one-way check valve is provided at the exit port of the flexible container. When the flexible body is squeezed, the material is urged out under pressure through the valve. The difficulty here is that the valve, over time, becomes partially clogged, thereby requiring that the user apply additional pressure to cause the valve to open. As a result, once the valve opens, the additional pressure causes more fluid material to be deposited than the user typically would have desired.

U.S. Pat. No. 7,419,322 represents a significant advancement over the above-described systems by providing a fluid dispensing device (10) that includes a container (20) with an interior fluid storage region (22) therein. A flexible metering housing (26) defined by a button (36) and a base plate (34) is disposed in fluid communication with the fluid storage region (22) with a first one-way valve (30) disposed between the container (20) and the flexible metering housing (26). One-way flow from the interior fluid storage region (22) of the container (20) fills the predetermined volume of the metering chamber (32) with fluid by vacuum action when the button (36) is depressed and then released. A second valve (40) is in fluid communication with the metering housing (26) and permits one-way fluid flow from the metering chamber (32) to the exterior outer region of the container (20) when the metering housing (26) is depressed again. Each time the metering housing (26) is depressed a substantially equal volume of fluid (24) is dispensed from the container (20).

U.S. Patent Application Publication No. 2008/0264973 relates to a similar concept, but discloses several additional embodiments that possess a simplified design as compared to those disclosed in U.S. Pat. No. 7,419,322, wherein the valving and dispensing functions are incorporated into a design that is relatively simplified and cost-effective to produce, yet that also provides excellent results. In particular, FIG. 17 and the corresponding description of U.S. Patent Publication No. 2008/0264973 discloses a "two-piece" configuration which has been found to provide particularly desirable results.

The present invention is essentially an improvement upon this "two-piece" configuration, which provides excellent results in certain situations and configurations of the metered dispensing pump.

SUMMARY OF THE INVENTION

The present invention preserves the advantages of prior art dispensing devices. In addition, it provides new advantages not found in currently available devices and overcomes many disadvantages of such currently available devices.

In accordance with one aspect of the invention, a fluid dispensing device comprises a container made from a flexible material defining an interior fluid storage region, a flexible metering housing having a metering chamber in fluid communication with said fluid storage region, said flexible metering housing having a button heat sealed to a base plate, a unidirectional intake valve disposed between said container and said flexible metering housing and a unidirectional output valve in fluid communication with said flexible metering housing. Said base plate has an extension with a recessed notch, a first tapered portion, and a second tapered portion opposite said first tapered portion with respect to said recessed notch, and said button has an extension and a notch corresponding to said extension and said recessed notch of said base plate.

In some embodiments, said button and said base plate are substantially circular in shape. In some embodiments, said first tapered portion, said recessed notch, and said second tapered portion are shaped as a boat fitment. In certain of these embodiments, said button and said base plate form a smooth and continuous outer surfaced, near said boat fitment, to facilitate heat sealing of said container. In certain embodiments, said boat fitment is shaped substantially similar to a canoe placed on its side.

In some embodiments, said unidirectional output valve is connected to a fluid conduit which is connected to an exit port of the fluid dispensing device. In certain of these embodiments, said output valve is on an opposite side of the fluid dispenser as said flexible metering housing. In certain embodiments, said unidirectional output valve is connected to a plurality of fluid conduits, said plurality of fluid conduits connected to a plurality of exit ports. In some embodiments, said unidirectional intake valve and said unidirectional output valve are one-way check valves.

In accordance with another aspect of the invention, a fluid dispensing device comprises a container made from a flexible material defining an interior fluid storage region, a substantially circular shaped base plate connected to said container, said base plate having an extension with a recessed notch, a first tapered portion, and a second tapered portion opposite said first tapered portion with respect to said recessed notch, a substantially circular shaped button heat sealed to said container, said button having an extension portion and a notch corresponding to said extension portion and said recessed notch of said base plate, a unidirectional intake valve disposed between said container and said flexible metering housing permitting flow of the fluid from said fluid storage region to said metering housing, and a unidirectional output valve in fluid communication with said flexible metering housing permitting flow of the fluid from said metering housing to an exterior of said container; Said button and said base plate form a flexible metering housing having a metering chamber in fluid communication with said fluid storage region.

In some embodiments, said first tapered portion, said recessed notch, and said second tapered portion are shaped as a boat fitment. In certain of these embodiments, said button and said base plate form a smooth and continuous outer surfaced, near said boat fitment, to facilitate heat sealing of said container. In certain embodiments, said boat fitment is shaped substantially similar to a canoe placed on its side.

In some embodiments, said unidirectional output valve is connected to a fluid conduit which is connected to an exit port of the fluid dispensing device. In certain of these embodiments, said output valve is on an opposite side of the fluid dispenser as said flexible metering housing.

In some embodiments, said unidirectional output valve is connected to a plurality of fluid conduits, said plurality of fluid conduits connected to a plurality of exit ports. In some embodiments, said unidirectional intake valve and said unidirectional output valve are one-way check valves. In some embodiments, the fluid dispensing device further comprises a strap connected to said container.

DETAILED DESCRIPTION OF THE INVENTION

Figure 1:
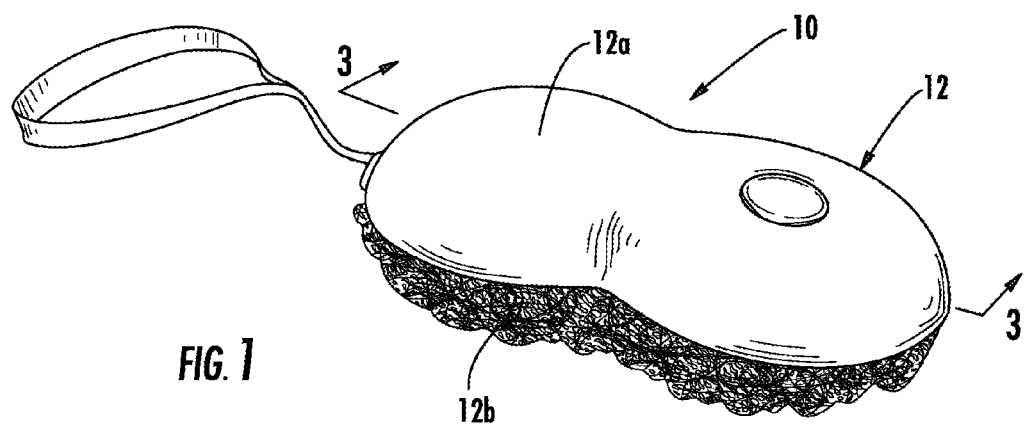
FIG. 1 is a top perspective view of a first embodiment of the dispensing device of the present invention.

U.S. Pat. No. 7,419,322 and U.S. Patent Publication No. 2008/0264973 are hereby incorporated by reference.

The exemplary embodiments of the present invention may be further understood with reference to the following description and the related appended drawings, wherein like elements are provided with the same reference numerals. The exemplary embodiments of the present invention are related to a metered dispensing device with a reduced heat-seal-cool cycle time. Specifically, the metered dispensing device has a modified button which allows for a quicker heat seal, which reduces the manufacturing time of each metered device.

Figure 2:
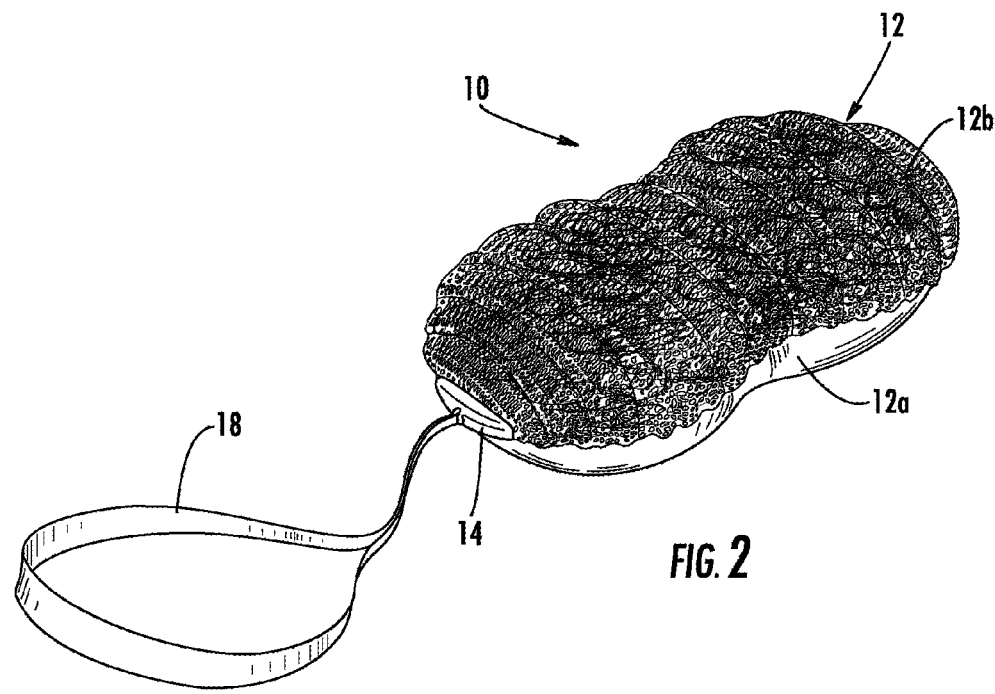
FIG. 2 is a bottom perspective view of the dispensing device of FIG. 2.

Referring first to FIGS. 1 and 2, the dispensing device 10 of the present invention is shown to include an outer covering, generally referred to as 12 which serves as an applicator material. This applicator material 12b can be formed of any type of material to suit the application at hand. For example, as seen in FIGS. 1 and 2, the cover 12 is preferably formed of two different types of material 12a and 12b to serve two purposes when in use. Preferably, the top section 12a is of a foam material while the bottom section 12b is of a mesh or "pouf" material. The top section 12a can be secured to the bottom section 12b by, for example, welding. A snap-fit cover 14 seals a re-fill port 16, as will be described in more detail in connection with FIG. 3. A hang strap or cord 18 can also be provided. The configuration of the applicator 12 is just one of many different types of applications of the present invention which will be discussed in more detail below. It is also possible that applicator materials 12 and 12b can be omitted if the intended purpose of the device is to only dispense fluid rather than to dispense and also assist in applying it.

Figure 3:
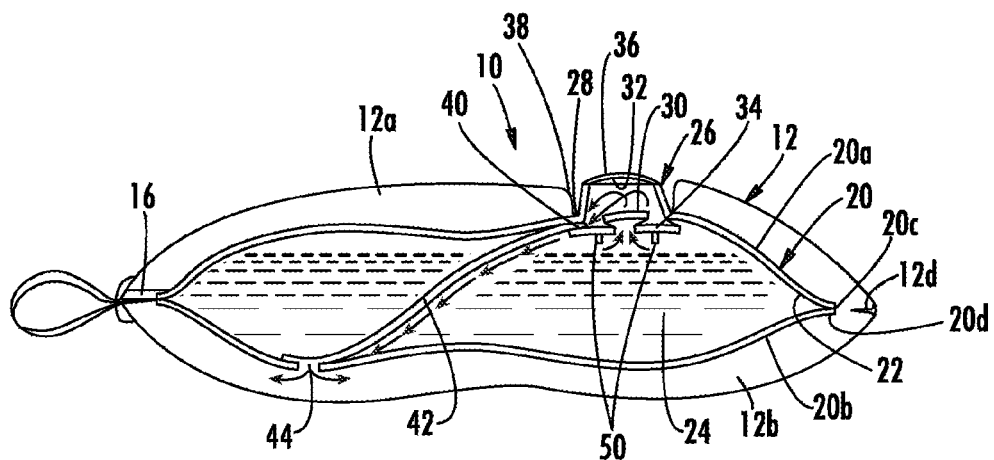
FIG. 3 is a cross-sectional view through the line 3-3 of FIG. 1.

Turning now to FIG. 3, a cross-sectional view through the line 3-3 of FIG. 1 is shown to illustrate the internal construction of an embodiment of the dispensing device 10 of the present invention. A container body 20 is provided which includes a fluid storage region 22 that contains a volume of fluid material 24 therein. The container 20 is preferably made of a flexible material, such as plastic or nylon. Thus, as fluid material 24 is evacuated from within the container body 20, it will collapse gradually for a compact structure.

A metering housing 26 is provided at a first opening 28 of the container body 20. The metering housing 26 includes an intake one-way valve 30, such as a check valve, to pull fluid 24 from the fluid storage region 22 of the container body 20 into a metering chamber 32 of a predetermined size. It should be noted that any type of valve can be used to suit the given application. The intake valve 30 is positioned in a base plate 34 of the metering housing 26. Thus, fluid 24 can only flow in one direction, namely from the fluid storage region 22 into the metering chamber 32. The metering chamber 32 is defined by a flexible membrane 36 in the form of a button or bulb which is accessible and manipulatable through a gap 38 in the applicator material 12. The button 36, which is also known as a dome pump, may be clear to provide an indicator to the consumer when the metered dosage of fluid material 24 is ready for delivery.

An output valve 40 is provided in fluid communication with the metering chamber 32 of the metering housing 26. Thus, the fluid residing in the metering chamber can only exit through the output valve 40. Also, a fluid conduit 42 is also provided to direct the exit of fluid 24 at any location through the container body. Preferably, as seen in FIG. 3, the fluid conduit 42 connects the output valve 40 of the metering housing 26 to an exit port 44 located on the bottom of the container body. This permits the metering housing 26 to be on an opposite side as the side through which the fluid 24 exits. It should be noted that the fluid conduit 42 can be directed and located to exit at any point through the container body 20 depending on the application at hand. Also, the output valve 40 may be located at the exit port 44, as an alternative, depending on the requirements of the application. The output valve 40 may be a flattened tube of material or two portions of material secured together.

Button 36 of the metering housing 26 is depressed to initiate a vacuum operation. More specifically, when the button 36 is further released, fluid 24 is pulled from the fluid storage region 22 of the container body 20 into the metering chamber 32 which is configured to be of a certain known volume. The act of releasing the button 36 fills the metering chamber 32 to substantial capacity. Thus, a metered amount of fluid material 24 is contained within the metering chamber 32 in preparation for delivery. The size of the metering chamber 32 can be selected according to the type of fluid material 24 to be dispensed and the application therefore and the desired dosage volume.

Further depression of the button or dome pump 36 urges the measured volume of fluid 24 within the metering chamber 32 out through the output valve 40 of the metering housing 26. This known amount of fluid material 24 is then either directly routed to an optional applicator 12 for use or through a fluid conduit 42, as seen in FIG. 3, for more targeted introduction into the applicator 12. In this case, it is preferred that the metered volume of fluid material 24 be routed to the bottom of the container body 20 for dispersion into the applicator portion 12b on the bottom surface thereof. For example, this configuration is particularly well-suited for dispensing body wash for bathing purposes. Other applications may require different exits and introduction locations into the applicator material 12. For example, the exit location of the liquid may be on the same side of the device 10 as the dome pump. This is particularly useful when the device 10 is intended solely for dispensing fluid without the use of an applicator 12.

Figure 4:
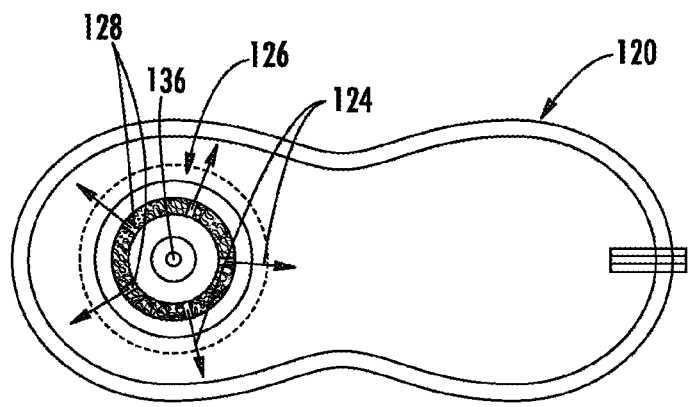
FIG. 4 is a top plan view of an alternative embodiment of the present invention.

In FIG. 4, an alternative construction of the container 120 with modified metering housing 126 is shown. In this embodiment, an array of output valves 128 are positioned radially about the periphery of the metering housing 126 to deliver fluid material 124 directly to the applicator material (not shown in FIG. 4 for ease of explanation) on the same side thereof without employing a fluid conduit 42 that is routed through the interior of the container body 20. This radial delivery pattern is well-suited for use in application devices requiring simultaneous dispersion of contents around the metering housing, such as for applying skin conditioner.

Figure 5:
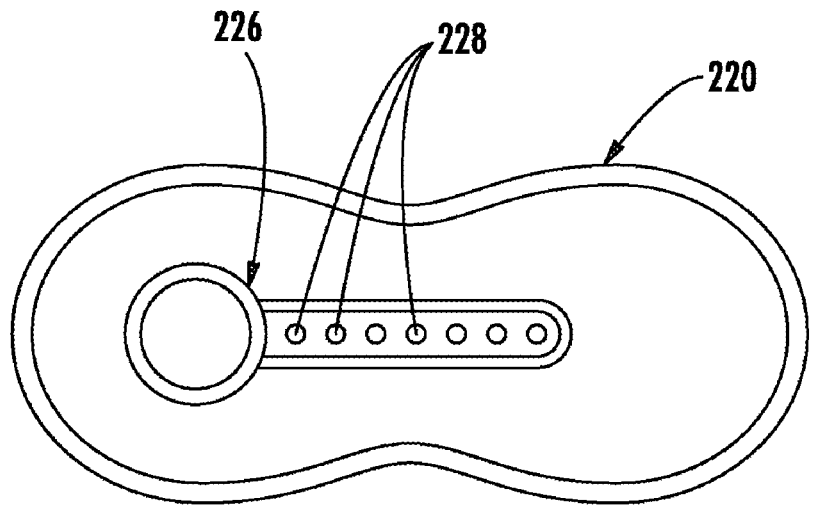
FIG. 5 is a top plan view of another alternative embodiment of the present invention.

FIG. 5 illustrates another alternative construction of a container 220 with modified metering housing 226 of the present invention where an array of output valves 228 is positioned linearly across the top surface of the container body 220 to deliver fluid material directly to the applicator material (not shown in FIG. 5 for ease of explanation) on the same side thereof without employing a fluid conduit. This linear delivery pattern is well-suited for use as an applicator that applies fluid in a linear stroke-based manner along the longitudinal axis of the device.

In accordance with the present invention, the direction of the delivery of the fluid material 24 can be easily modified to suit the application at hand. In certain applications, it is desirable that the applicator material 12, located on the top and the bottom of the container body 20, receive fluid material in an evenly distributed fashion. As shown above, the fluid material 24 can be directed out from any location on the container 20 to deliver the fluid as desired. It is frequently desirable that the fluid 24 be able to passively flow from one side 20a of the container 20 to the opposing side 20b of the container 20, particularly at the edges 20c thereof.

Referring back to FIG. 1, an efficient method of manufacturing a quality dispensing device 10 is to employ heat welding to construct the container 20 and the applicator material 12 thereon. For example, a top portion 20a is typically heat welded to a bottom portion 20b about their periphery 20c to form a container 20 with an interior fluid storage region 22 therein. The applicator material 12 is similarly secured to the container 20 by heat welding or other similar processes, such as gluing, either about its periphery or its entire contact surface with the container 20.

Use of a heat welding seam 20d about the periphery 20c of the container 20 is employed to reduce the flow and wicking action of the fluid 24 in the applicator material 12a on one side to the applicator material 12b on the other side and vice versa. Thus, fluid 24 must travel over the seam 20d of the container and seam 12d of the applicator material 12 to be present on the opposing side. Seams 12d and 20d prevent the fluid 24 from freely flowing from the front of the container 20 to the back and vice versa.

Figure 6:
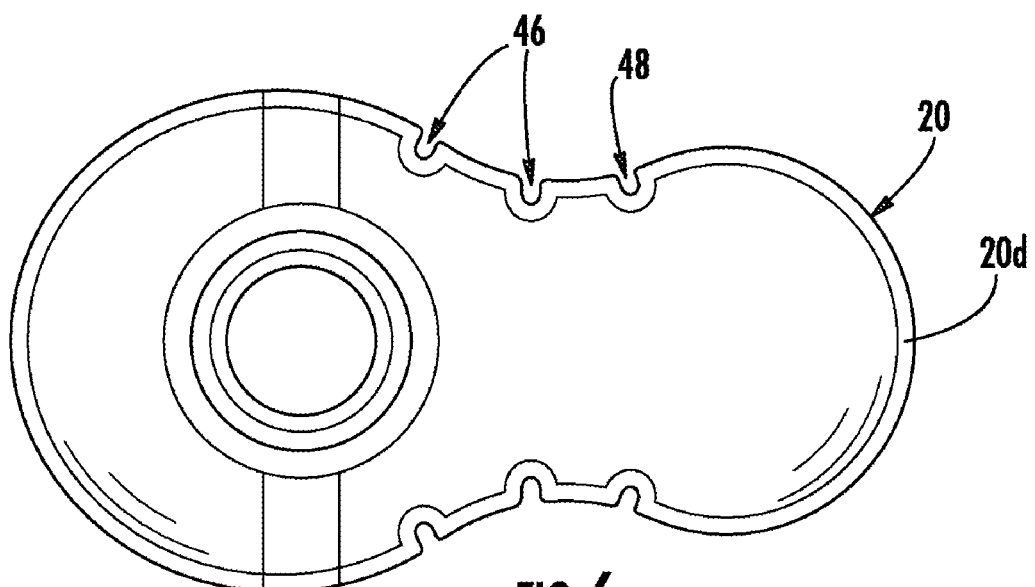
FIG. 6 is a top plan view of another embodiment of the dispensing device of the present invention showing flow enhancing notches.

FIG. 6 illustrates a further modification to the container 20 which is within the scope of the present invention to address the problem indicated above. More specifically, a number of notches 46 are formed in the peripheral edge 20d of the container 20 to permit flow of fluid material 24 easily from one side of the container 20 to the other. When the applicator material 12 is heat sealed to the container at its peripheral edge to form a seam 12d, a number of pass-through apertures 48 are formed between the seam 20d, 12d and the applicator material 12 to permit free flowing travel of fluid material 24 from one side of the device 10 to the other and back without having to travel over the peripheral seams 12d and 20d.

The applicator material 12 can be foam, such as open cell foam, fabric, blended material, co-extruded material and combinations thereof. It should be understood that these materials are just examples of the types of materials that can be used in connection with the dispenser 10 of the present invention; the specific material is determined by the given application and the type of material to be dispensed.

When fluid material 24 is dispensed within the foam, the fluid 24 will tend to equilibrate the moisture by moving the moisture from a point of high moisture to a point of low moisture. This wicking action causes the fluid 24 to naturally propagate through the applicator material 12. Since there is an absence of applicator material 12 at the periphery, the notches 46 and pass-through apertures 48, of FIG. 6, facilitate the wicking action from one side of the device 10 to the other, if necessary in that application.

Non-woven materials or fibers may also be employed as the material for the applicator 12 on one or both sides of the device. For example, reticulated foam may also be employed. These materials are well-suited as applicators 12 for more harsh chemicals, such as tire cleaner and paint remover where toughness is required. Also, more abrasive material can be provided on one side of the device for more aggressive cleaning, for example, while the opposing side has a polishing type surface.

In general, the size, density and wicking action of the cells and overall size of the applicator 12 can be modified to suit the particular fluid to be applied. The foregoing applicators can be incorporated into any of the embodiments of the present invention regardless of whether the material exits on the same side of the container 20 as the pump.

Figure 7:
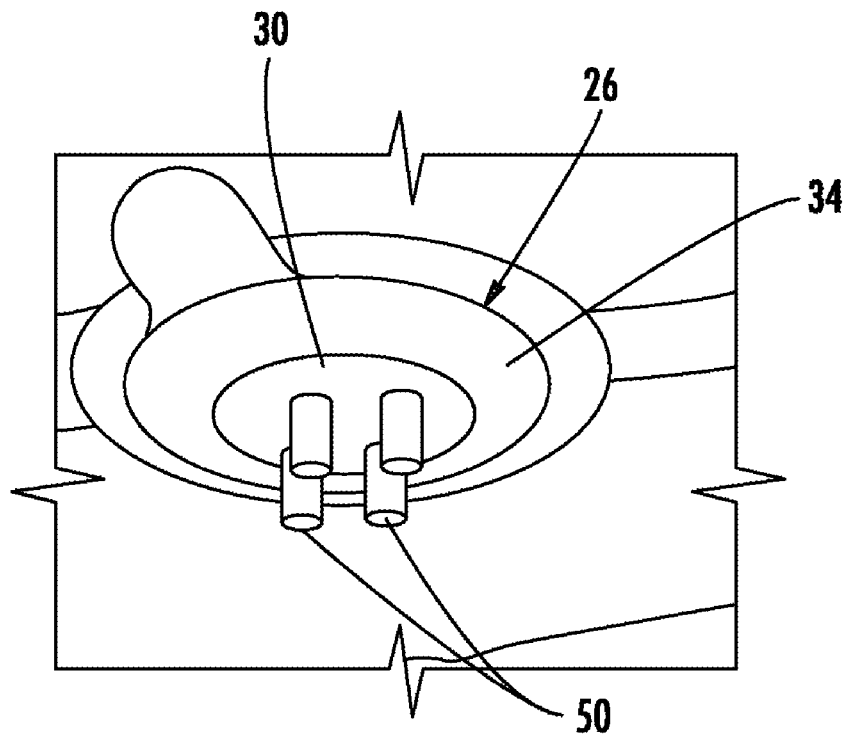
FIG. 7 is a close-up perspective view of the metering housing with stand-off legs on the bottom of the dividing plate of the pumping mechanism.
Figure 8:
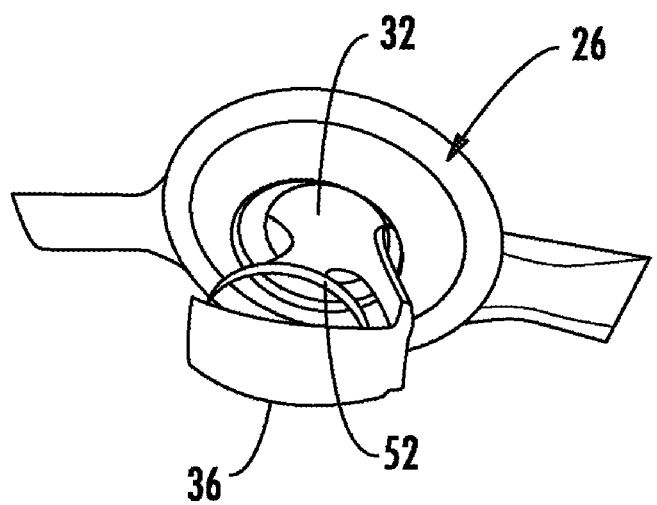
FIG. 8 is a close-up perspective view of the metering housing with coil spring.

Turning now to FIGS. 1, 7 and 8, further enhancements to the metering housing 26 construction are shown in detail. As seen in FIGS. 1 and 7, a number of stand-off legs 50 emanate downwardly from the base plate 34 of the metering housing 26. These legs 50 prevent the base plate 34 from completely bottoming out and blocking the flow of fluid material 24 into the intake valve 30. The stand-off legs 50 are particularly useful when the volume of fluid material 24 left in the container 20 is running low and the container 20 is becoming relative flat in configuration. In this situation, there is a possibility that the aforesaid bottoming out may occur. However, the use of the stand-off legs 50 of FIGS. 1 and 7 prevent this from occurring.

FIG. 8, with reference back to FIG. 1, illustrates a further modification of the metering housing 26 to ensure that maximum suction is achieved and that the entire metering chamber 32 is filled upon each depression and release of the button 36. A spring-biasing structure 52 resides within the button or bulb structure 36 of the metering housing 26. Thus, the button 36 recovers quickly while providing a strong suction or vacuum to fill the interior of the metering chamber 32 with the desired metered volume of fluid material 24. A coil spring is preferred for the spring-biasing structure 52 but other spring-biasing structures, such as leaf springs and foam material, may be employed for this purpose.

Figure 9:
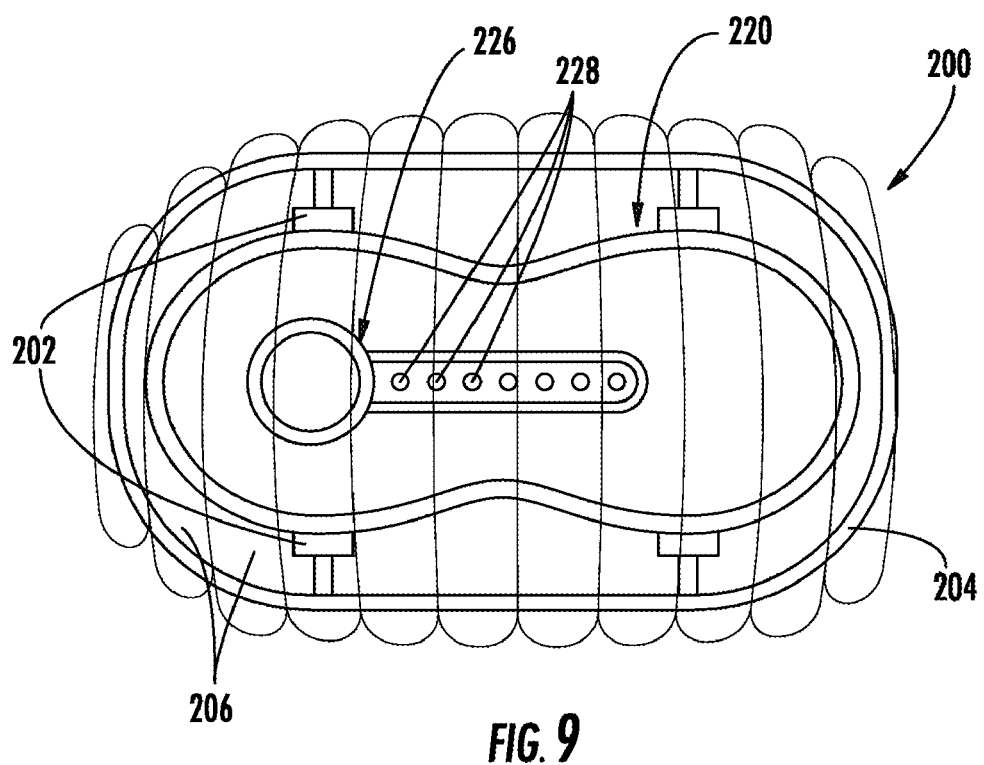
FIG. 9 is a top plan view of another alternative embodiment of the present invention.

FIG. 9 illustrates yet a further alternative embodiment 200 of the present invention where a container, such as container 220, includes a series of tabs 202 that emanate outwardly from the container 220. An outer frame or skeleton 204 is connected to the container 220 via the tabs 202. Applicator material 206, such as "pouf" or fabric material is then attached to the frame 204 with the container 220 residing therein. This embodiment 200 is particularly well-suited to permit free flowing of fluid material about the dispenser 200.

Figure 10:
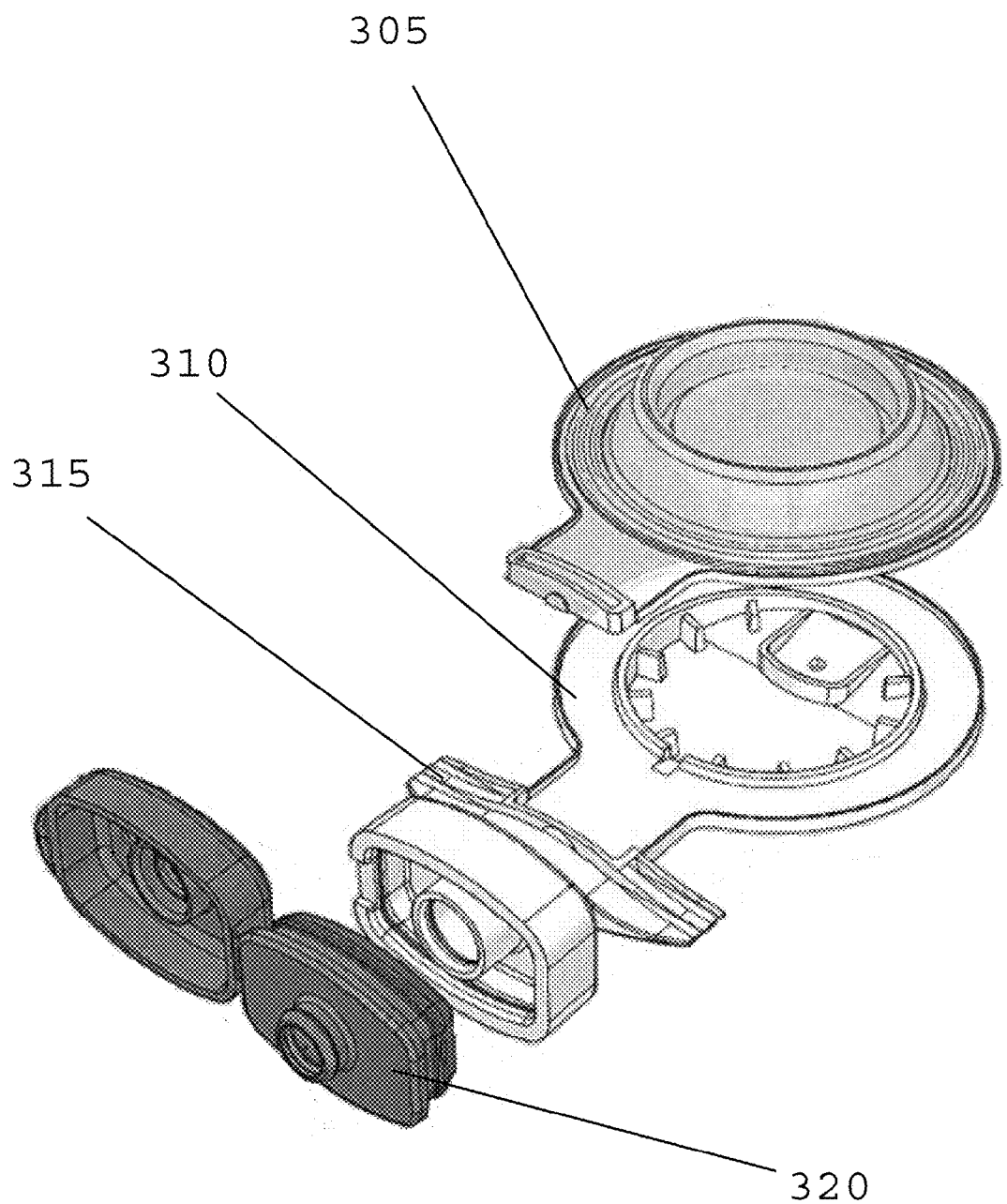
FIG. 10 is an exploded view of a button according to the present invention.
Figure 11:
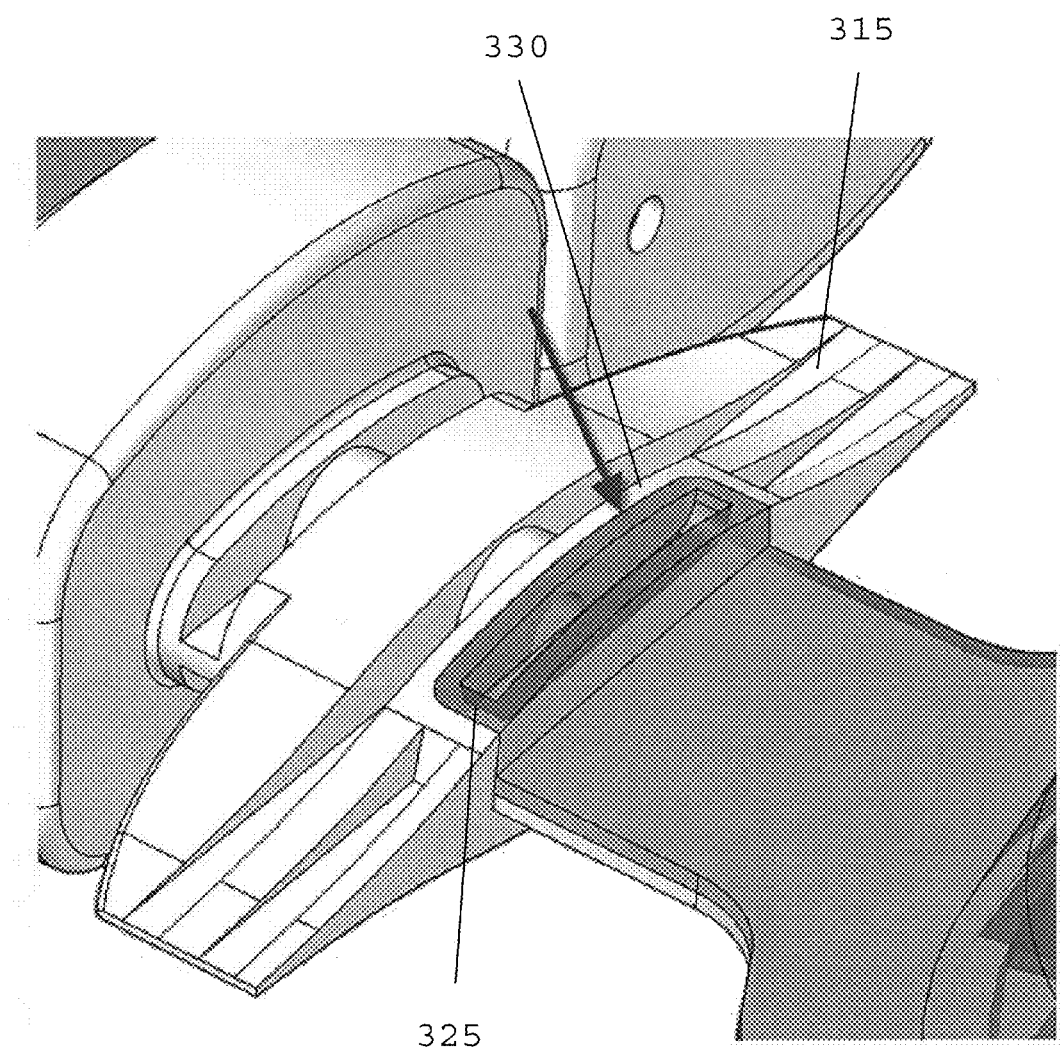
FIG. 11 is a close-up view of the button from FIG. 10.

As best seen in FIGS. 10 and 11, an exploded view of button, and a close-up view of a button, is shown. The metered dispensing pump of the present invention generally includes two pieces, a dome piece 305 and a backer piece 310, the configuration and operation of which are very similar to the corresponding integrated dome button 608 and top portion 610 unit and the integrated base plate 602 and bottom portion 604 unit of the embodiment of FIG. 17 of U.S. Patent Application Publication No. 2008/0264973. A third piece, a cap/orifice 320, is also shown in the FIGS. 10-11, although this piece does not form a part of the metered dispensing pump itself.

Backer piece 310 includes various orifices, channels and features similar to those discussed in connection with the integrated base plate 602 and bottom portion 604 unit of the embodiment of FIG. 17 of U.S. Patent Application Publication No. 2008/0264973. As such, these features are not discussed in detail herein. However, in accordance with the present invention, toward the end of the backer piece 310 nearest the orifice, and in the area of where the flexible storage container is to be sealed to the metered dispensing pump with the metered dispensing pump positioned therein, there is provided a portion with tapered ends termed a "boat fitment" 315, so-called because in cross-section it resembles the shape of a boat or canoe. As best seen in FIG. 11, the boat fitment 315 defining portion of the backer piece 310 includes a recessed notch 330 at the inner edge thereof.

The dome piece 305 includes various parts and features similar to those discussed in connection with the integrated dome button 608 and top portion 610 unit of the embodiment of FIG. 17 of U.S. Patent Application Publication No. 2008/0264973, and as such, these parts and features are not discussed in detail herein. However, in accordance with the present invention, dome piece 305 includes, as best seen in FIG. 10, an upwardly extending protrusion toward the end of an extension member defining an exit pathway, the protrusion having a size and shape corresponding to the recessed notch 330 in the boat fitment 315 defining portion of the backer piece 310.

When the dome piece 305 and the backer piece 310 are disposed adjacent to each other in an assembled position, the protrusion 325 on the extension member of the dome piece 305 nests within the recessed notch 330 in the boat fitment 315 defining portion of the backer piece 310, such that a boat fitment 315 having a smooth and continuous outer surface is defined, with the possible exception of recesses formed in the boat fitment 315 in order to facilitate heat sealing of the flexible storage container thereto.

More specifically, the dome piece 305 and the backer piece 310, disposed adjacent to each other in the assembled position, are positioned between sheets of flexible material (not shown) along edges thereof, and with the dome portion of the dome piece 305 extending through an opening in one of the sheets. The edges of the sheets are positioned adjacent opposite sides of the boat fitment 315, and the sheets of material are sealed to one another, and to the opposite sides of the boat fitment 315. Due to the nesting configuration of the protrusion 325 on the extension member of the dome piece 315 within the recessed notch 330 in the boat fitment 315 defining portion of the backer piece 310, proper alignment, as well as a secure seal, are ensured. The sheet with the opening therein is also sealed to the dome piece 305, the latter of which may be provided with concentrator rings to facilitate proper sealing.

It would be appreciated by those skilled in the art that various changes and modification can be made to the illustrated embodiment without departing from the spirit of the invention. All such modification and changes are intended to be covered hereby.

What is claimed is:

1. A fluid dispensing device comprising:
  a container made from a flexible material defining an interior fluid storage region;
  a flexible metering housing having a metering chamber in fluid communication with said fluid storage region, said flexible metering housing having a button heat sealed to a base plate;
  a unidirectional intake valve disposed between said container and said flexible metering housing;
  a unidirectional output valve in fluid communication with said flexible metering housing;
  wherein said base plate has an extension with a recessed notch, a first tapered portion, and a second tapered portion opposite said first tapered portion with respect to said recessed notch; and
  wherein said button has an extension and a notch corresponding to said extension and said recessed notch of said base plate.

2. The fluid dispensing device of claim 1, wherein said button and said base plate are substantially circular in shape.

3. The fluid dispensing device of claim 1, wherein said first tapered portion, said recessed notch, and said second tapered portion are shaped as a boat fitment.

4. The fluid dispensing system of claim 3, wherein said button and said base plate form a smooth and continuous outer surfaced, near said boat fitment, to facilitate heat sealing of said container.

5. The fluid dispensing device of claim 3, wherein said boat fitment is shaped substantially similar to a canoe placed on its side.

6. The fluid dispensing device of claim 1, wherein said unidirectional output valve is connected to a fluid conduit which is connected to an exit port of the fluid dispensing device.

7. The fluid dispensing device of claim 6, wherein said output valve is on an opposite side of the fluid dispenser as said flexible metering housing.

8. The fluid dispensing device of claim 6, wherein said unidirectional output valve is connected to a plurality of fluid conduits, said plurality of fluid conduits connected to a plurality of exit ports.

9. The fluid dispensing device of claim 1, wherein said unidirectional intake valve and said unidirectional output valve are one-way check valves.

10. A fluid dispensing device comprising:
a container made from a flexible material defining an interior fluid storage region;
a substantially circular shaped base plate connected to said container, said base plate having an extension with a recessed notch, a first tapered portion, and a second tapered portion opposite said first tapered portion with respect to said recessed notch;
a substantially circular shaped flexible button heat sealed to said base plate, said button having an extension portion and a notch corresponding to said extension portion and said recessed notch of said base plate;
a unidirectional intake valve disposed between said container and a flexible metering housing permitting flow of the fluid from said fluid storage region to said metering housing;
a unidirectional output valve in fluid communication with said flexible metering housing permitting flow of the fluid from said metering housing to an exterior of said container;
wherein said button and said base plate form said flexible metering housing having a metering chamber in fluid communication with said fluid storage region.

11. The fluid dispensing device of claim 10, wherein said first tapered portion, said recessed notch, and said second tapered portion are shaped as a boat fitment.

12. The fluid dispensing system of claim 11, wherein said button and said base plate form a smooth and continuous outer surfaced, near said boat fitment, to facilitate heat sealing of said container.

13. The fluid dispensing device of claim 11, wherein said boat fitment is shaped substantially similar to a canoe placed on its side.

14. The fluid dispensing device of claim 10, wherein said unidirectional output valve is connected to a fluid conduit which is connected to an exit port of the fluid dispensing device.

15. The fluid dispensing device of claim 14, wherein said output valve is on an opposite side of the fluid dispenser as said flexible metering housing.

16. The fluid dispensing device of claim 10, wherein said unidirectional output valve is connected to a plurality of fluid conduits, said plurality of fluid conduits connected to a plurality of exit ports.

17. The fluid dispensing device of claim 10, wherein said unidirectional intake valve and said unidirectional output valve are one-way check valves.

18. The fluid dispensing device of claim 10, further comprising a strap connected to said container.

* * * * *